United States Patent [19]
Cole et al.

[11] Patent Number: 5,573,037
[45] Date of Patent: Nov. 12, 1996

[54] FAUCET VALVE WITH EXTERNAL CAM AND PINCH TUBES

[75] Inventors: George S. Cole, Pebble Beach, Calif.; Harry W. Edwards, Barrington, Ill.

[73] Assignee: George S. Cole & Associates, Incorporated, Pebble Beach, Calif.

[21] Appl. No.: 562,821

[22] Filed: Nov. 27, 1995

[51] Int. Cl.⁶ .............................. F16K 7/06; F16K 11/14
[52] U.S. Cl. .......................... 137/636.4; 137/607; 251/7
[58] Field of Search ......................... 137/625.17, 625.4, 137/636, 636.1, 636.4, 607; 251/7, 8, 9

[56] References Cited

U.S. PATENT DOCUMENTS

| | | | |
|---|---|---|---|
| 3,172,426 | 3/1965 | Cole | 137/636.4 |
| 3,190,312 | 6/1965 | Classen et al. | 137/625.4 |
| 3,436,054 | 4/1969 | Cole et al. | 251/8 |
| 3,519,018 | 7/1970 | Cole et al. | 137/625.4 |
| 3,586,053 | 6/1971 | Browning | 137/636.4 |
| 3,646,966 | 3/1972 | Smart | 137/625.4 |
| 3,693,663 | 9/1972 | Tolnai et al. | 137/636.4 |
| 3,774,643 | 11/1973 | Cole et al. | 137/636.4 |
| 3,805,842 | 4/1974 | Thompson et al. | 137/636.4 |
| 3,861,421 | 1/1975 | Thompson | 137/636.4 |
| 3,880,400 | 4/1975 | Cole et al. | 137/636.1 |
| 3,978,890 | 9/1976 | Barnum | 137/636.4 |
| 4,183,376 | 1/1980 | Moen | 137/625.17 |
| 4,187,880 | 2/1980 | Humpert et al. | 137/625.17 |
| 4,292,997 | 10/1981 | Bernat | 137/454.6 |
| 4,313,469 | 2/1982 | Johnson | 137/637 |
| 4,607,659 | 8/1986 | Cole | 137/636.4 |
| 4,633,906 | 1/1987 | Tuchman | 137/625.17 |
| 4,651,769 | 3/1987 | Wagner | 137/625.17 |
| 5,007,446 | 4/1991 | Grove | 137/636.1 |
| 5,080,134 | 1/1992 | Orlandi | 137/625.17 |
| 5,144,981 | 9/1992 | Bergmann | 137/625.4 |
| 5,176,168 | 1/1993 | Stoll et al. | 137/454.5 |
| 5,195,555 | 3/1993 | Knapp | 137/454.6 |
| 5,213,134 | 5/1993 | Orlandi | 137/625.4 |
| 5,275,195 | 1/1994 | Breda | 137/636.4 |

*Primary Examiner*—George L. Walton
*Attorney, Agent, or Firm*—Emrich & Dithmar

[57] ABSTRACT

A valve cartridge is provided. The valve cartridge includes a cartridge retainer having a cartridge axis and a generally cylindrical sidewall having first and second openings and first and second pinch tubes disposed within the cartridge retainer. The pinch tubes respectively have tube axes substantially parallel to the cartridge axis and axial bores therethrough. The valve cartridge also includes first and second poppets disposed in the first and second openings and movable in a direction not parallel with the tube axes for engagement respectively with the pinch tubes, and an actuator rotatable about and movable along the cartridge axis and encircling the cartridge retainer. The actuator has an interior surface engaging the first and second poppets and having a cylindrical portion having an inside diameter which, when engaged with the poppets, holds the poppets against the pinch tubes for closing the bores, and an eccentric portion tapering outwardly from the cylindrical portion which, when engaged with the poppets, permits variations in the cross sectional areas of the axial bores to control the rates of flow through the pinch tubes.

20 Claims, 4 Drawing Sheets

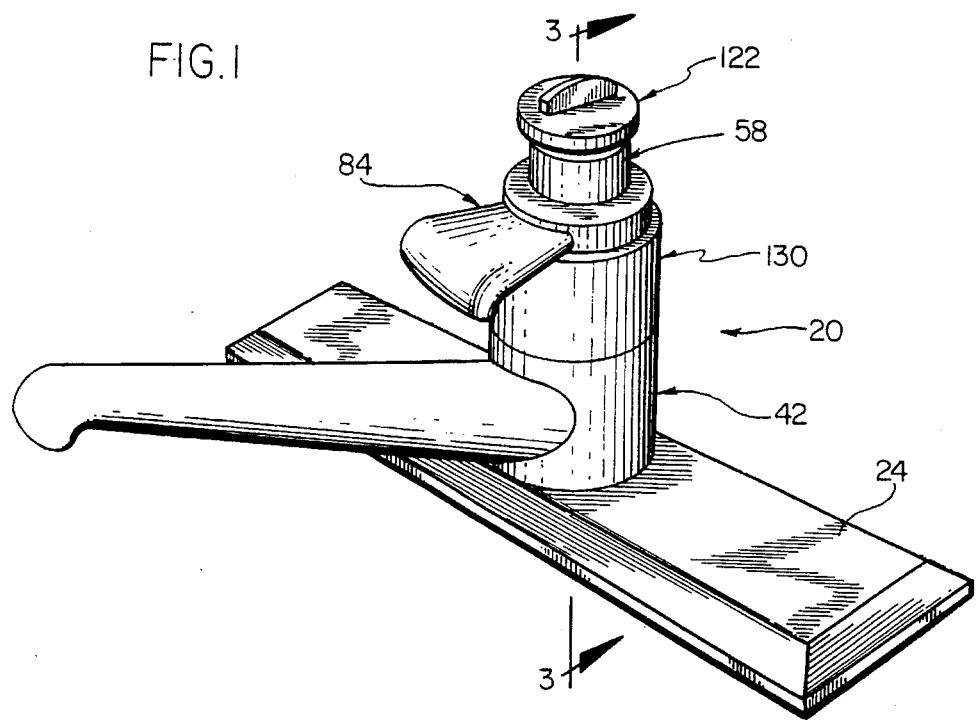
FIG. 1
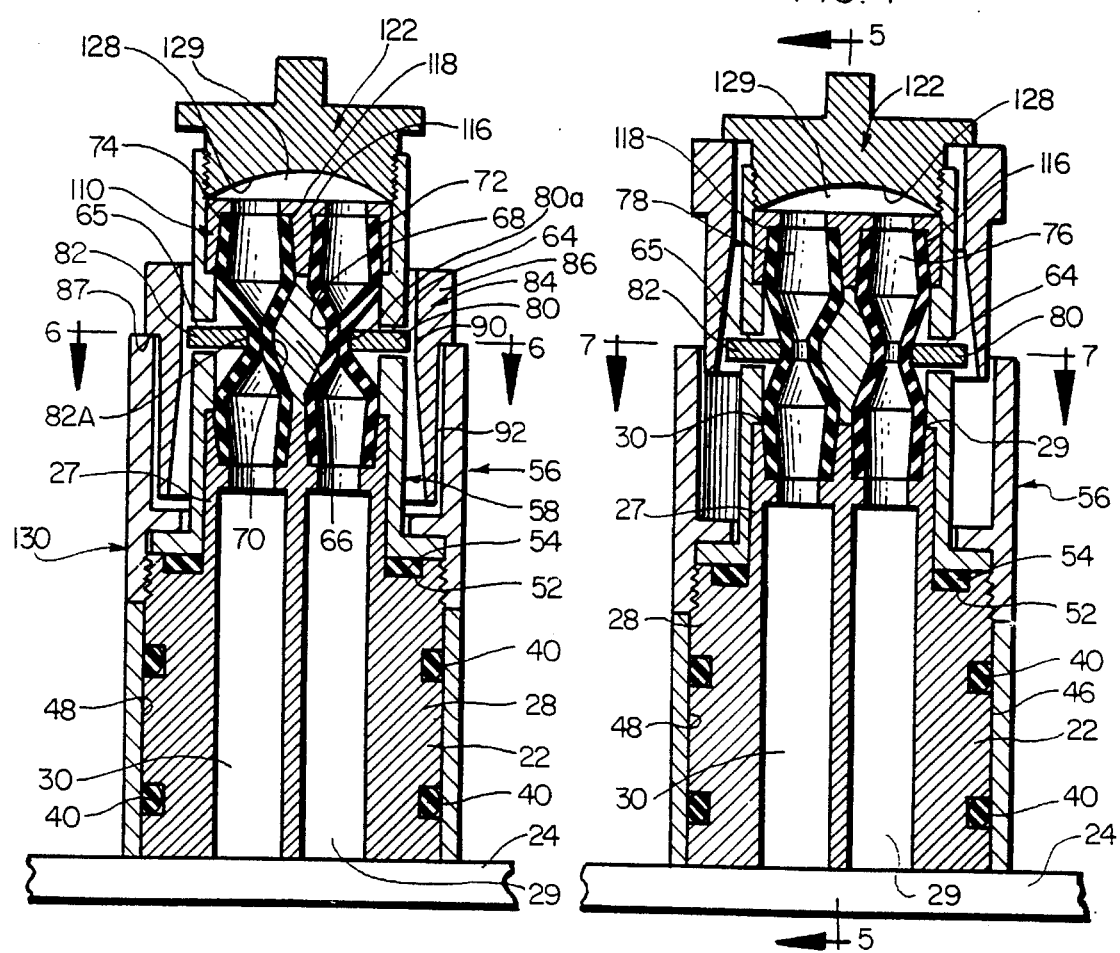
FIG. 3
FIG. 4

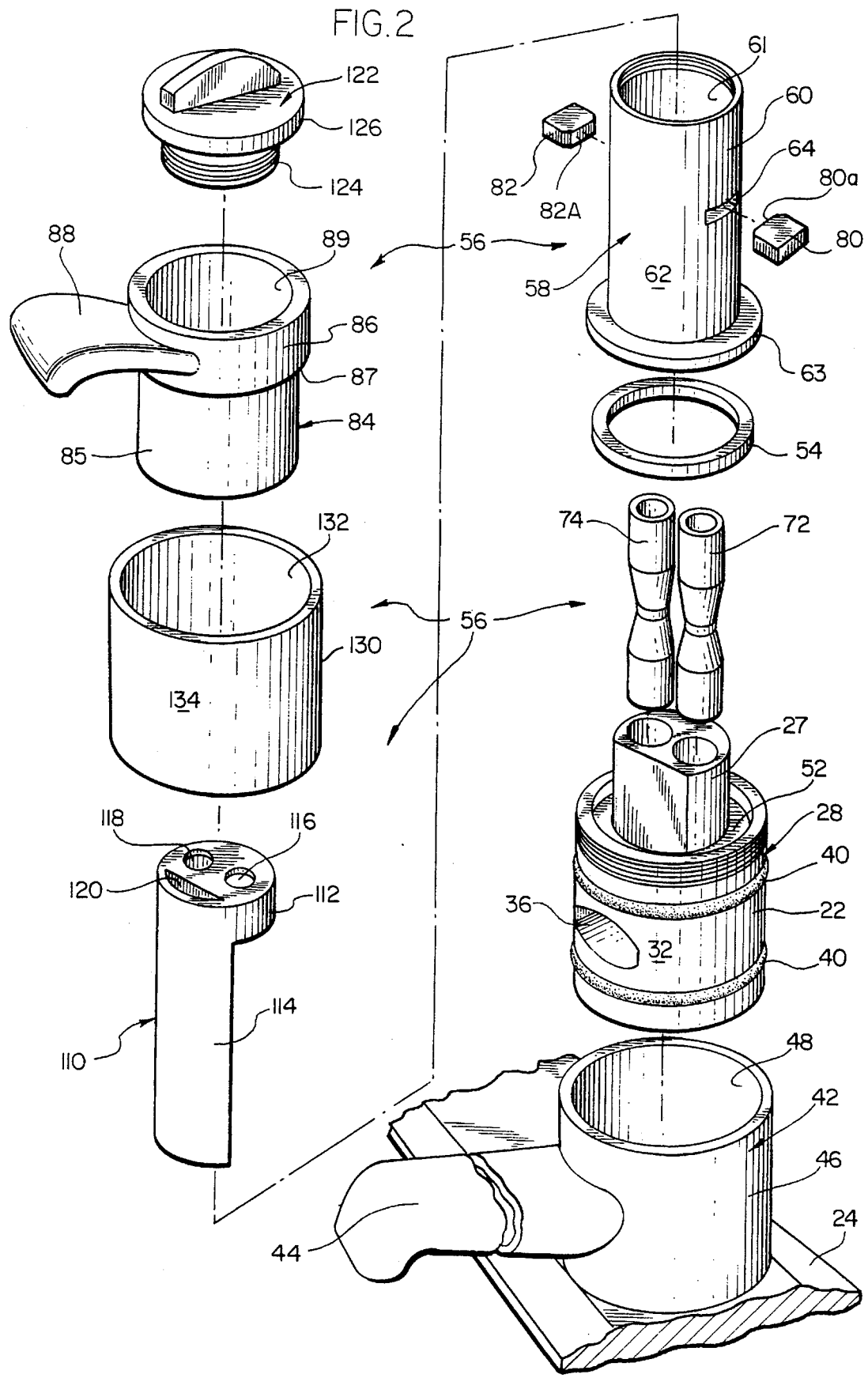

FAUCET VALVE WITH EXTERNAL CAM AND PINCH TUBES

BACKGROUND OF THE INVENTION

1. Field of the Invention

The invention relates to single control proportioning valves for liquids, such as hot and cold water and, more particularly, to pinch tube valves, wherein a control cam mechanism is disposed for engagement with a pair of valve tubes to control the degree of pinching of, and thereby the proportioning and flow rate through, the valve tubes.

2. Description of the Prior Art

In the past, external camming sleeves having an eccentric interior surface portion have been used to control both the rate of flow and the proportioning for single control proportioning valves for a faucet having two supply lines. For example, in U.S. Pat. No. 3,880,400, the interior surface of a camming sleeve is used to selectively engage rubber pads covering the inlet ports of a valve body of a two supply line valve to vary the flow from each supply line through the valve. Though this valve works well, the valve body is of an intricate structure and expensive to make and replace.

Additionally, valves having two simple resilient rubber tubes, each fluidly connected to a different supply line have also been used in single control valves. These valves include a rigid cam member with a cammed exterior surface disposed between two resilient tubes. The axis of the cam member is perpendicular to the axes of the tubes. The cam member has a cylindrical portion and an eccentric conical portion and is rotatably and axially slidably movable within an elongated valve cavity. When the cam member is completely retracted within the valve cavity, its cylindrical portion engages the valve tubes and completely pinches them off. As the cam member is withdrawn or extended from the cavity, the conical portion thereof passes between the valve tubes, allowing them to expand and permitting an increasing flow rate therethrough, proportional to the amount of extension of the cam member. As the cam member is rotated, the eccentric conical portion presses or pinches the two valve tubes different amounts, so as to control the proportioning therebetween.

Since the axes of the resilient tubes of this type valve are perpendicular to the axis of the cam member, a special faucet design for a kitchen faucet is needed to accommodate this valve. Also, the flows from the two lines first combine after exiting the outlets of the two tubes. Since the outlets of the two tubes are close to the faucet outlet, the two flows are only allowed to mix for a short time. This short mixing time may cause an undesired laminar type flow, wherein the flow exiting the faucet includes portions made nearly entirely of hot or cold water (assuming a hot water supply line is connected to one tube and a cold water supply is connected to the other tube).

SUMMARY OF THE INVENTION

It is a general object of the invention to provide an improved valve cartridge/faucet assembly which avoids the disadvantages of prior assemblies while affording additional structural and operational advantages.

An important feature of the invention is the provision of a valve cartridge/faucet assembly which is of a relatively simple and economical construction.

A still further feature of the invention is the provision of an improved valve cartridge which can be mounted on a standard trunion.

Yet another feature of the invention is the provision of an assembly of the type set forth which is easily repairable.

Another feature of the invention is the provision of an assembly of the type set forth which aids in preventing laminar flow.

These and other features of the invention are attained by providing a valve cartridge which comprises a cartridge retainer having a cartridge axis and a generally cylindrical sidewall having opening and a pinch tube disposed within the cartridge retainer. The pinch tube has a tube axis substantially parallel to the cartridge axis and an axial bore therethrough. The valve cartridge also includes a poppet disposed in the opening and movable in a direction not parallel with the tube axis for engagement with the pinch tube, and an actuator rotatable about and movable along the cartridge axis and surrounding the cartridge retainer. The actuator has an interior surface engaging the poppet with a cylindrical portion having an inside diameter which, when engaged with the poppet, holds the poppet against the pinch tube for closing the bore and an eccentric portion tapering outwardly from the cylindrical portion which, when engaged with the poppet, permits variations in the cross sectional area of the axial bore to control the rate of flow through the pinch tube.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of the valve and faucet assembly of the present invention;

FIG. 2 is an enlarged, exploded, perspective view of the assembly of FIG. 1;

FIG. 3 is an enlarged, sectional view taken generally along the line 3—3 in FIG. 1, illustrating the assembly in its fully closed condition;

FIG. 4 is a view similar to FIG. 3, illustrating the assembly in an open condition;

DETAILED DESCRIPTION OF THE PREFERRED EMBODIMENT

Figure 5:
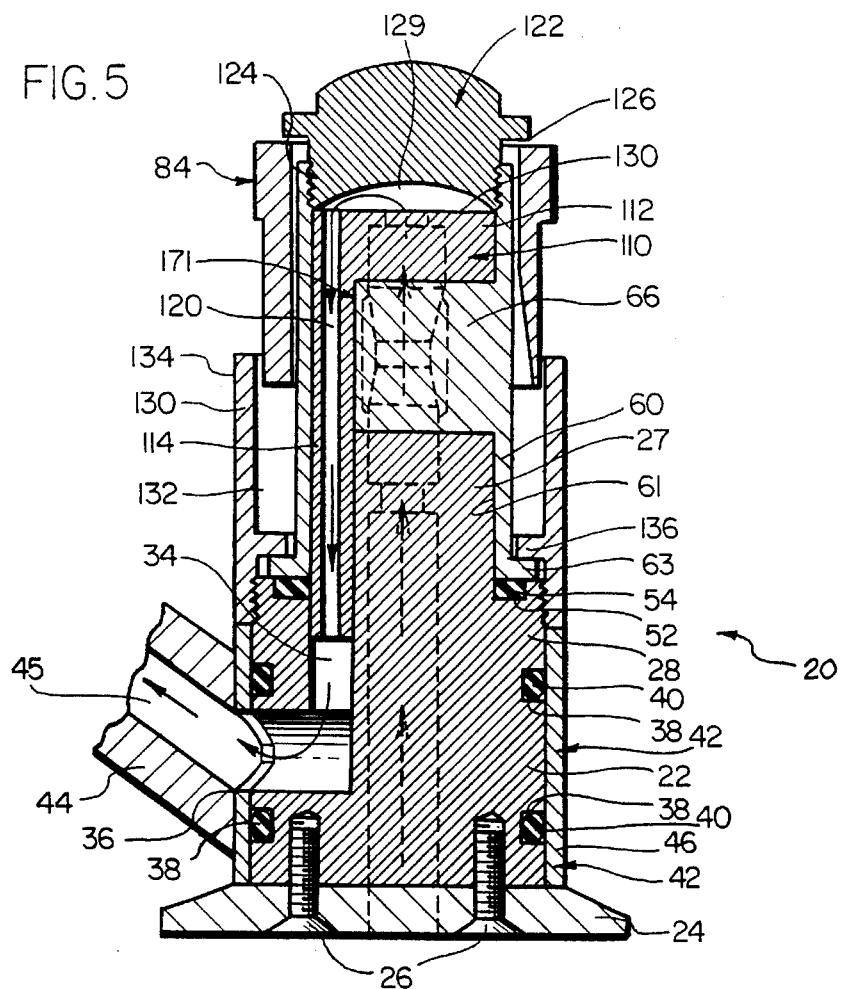
FIG. 5 is a fragmentary, sectional view taken generally along line 5—5 in FIG. 4.

As seen in FIG. 1, a valve/faucet assembly 20 is provided. As seen in FIGS. 2 and 5, the valve/faucet assembly 20 includes a standard trunion 22 mounted on a base 24 by a pair of screws 26 (FIG. 5). The trunion 22 includes a truncated cylindrical upper portion 27 integral with a wider cylindrical lower portion 28. The trunion 22 also includes a first supply duct 29 and a second supply duct 30 connected to supply lines (not shown), such as hot and cold water lines. The supply ducts 29, 30 run through both the truncated cylindrical upper portion 27 and the cylindrical lower portion 28. As seen in FIGS. 2 and 5, the cylindrical portion 28 has a cylindrical outer surface 32 and also includes an L-shaped discharge duct 34 having an oval-shaped opening 36 at the outer surface 32. The outer surface 32 is threaded at its upper end and includes a pair of annular grooves 38, respectively above and below the opening 36, each of which has an O-ring 40 disposed therein.

Disposed rotatably about the trunion 22 is a spigot assembly 42 which includes a spigot 44 which has a discharge passageway 45 and which is integral with a generally cylindrical sidewall 46 having an interior surface 48. The O-rings 40 seal the flow path from the opening 36 to the spigot 44, while accommodating rotation of the spigot assembly 42. The cylindrical portion 28 of the trunion 22 includes a generally annular recess 52 at its upper end in which a washer 54 is seated.

Connected to the trunion 22 is an elongated valve cartridge assembly 56 which includes a cartridge retainer 58. The cartridge retainer 58 has an axis and includes a generally cylindrical sidewall 60 having an interior surface 61 and an exterior surface 62. The cartridge retainer 58 also includes an annular flange 63 which projects radially outwardly from the bottom end of the exterior surface 62 of the sidewall 60 and sits upon the washer 54 disposed in the annular recess 52 of the cylindrical portion 28 of the trunion 22.

The cartridge retainer 58, as seen in FIGS. 2–4 and 6–9, also includes first and second generally rectangular shaped openings 64, 65 spaced about 180 degrees apart in the sidewall 60. As seen in FIGS. 2 and 5, the interior surface 61 of the sidewall 60 is threaded at its upper end. As best seen in FIGS. 5–9, the cartridge retainer 58 has a bearing wall 66 projecting radially inwardly from the interior surface 61. The bearing wall 66 does not extend the full diameter of the cylindrical sidewall 60 or the full length of the cartridge retainer 58. The wall 66 has a first side surface 68 which faces the first rectangular opening 64, a second side surface 70 which faces the second rectangular opening 65, and an end surface 71 interconnecting the first and second side surfaces 68, 70.

The valve cartridge assembly 56 also includes elongated first and second pinch tubes 72, 74 disposed within the cartridge retainer 58 and, respectively, having first and second axes substantially parallel to the axis of the cartridge retainer 58 and first and second axial tube bores 76, 78. The first pinch tube 72 is disposed between the first side surface 68 of the bearing wall 66 and the cylindrical sidewall 60 and the second pinch tube 74 is disposed between the second side surface 70 of the bearing wall 66 and the cylindrical sidewall 60. The bottom ends of the pinch tubes 72, 74 are, respectively, disposed in the upper ends of the first and second supply ducts 29, 30. The pinch tubes 72, 74 are constructed of a resilient material that aids in maintaining the bores 76, 78 open and the tubes 72, 74 in their undistorted shape, as seen in FIG. 2. As seen in FIGS. 3 and 4, the upper ends of the supply ducts 29, 30 are each tapered inwardly from their opening to a narrower inside diameter to respectively provide an interference fit with the first and second pinch tubes 72, 74.

The valve cartridge assembly 56 also includes first and second poppets 80, 82 which are, respectively, movably disposed within the first and second rectangular openings 64, 65 and generally rectangular in transverse cross-section. The first and second poppets 80, 82 respectively have first and second tube-engaging ends 80a, 82a which, as discussed below, respectively engage or pinch the first and second pinch tubes 72, 74 to vary the cross-sectional area of the first and second bores 76, 78 and, therefore, the flow therethrough.

The valve cartridge assembly 56 also includes a generally cylindrical shaped actuator 84 which encircles and is coaxial with the cartridge retainer 58. The actuator 84 is movable axially and rotatably to control the rate of flow through the pinch tubes 72, 74. The actuator 84 has a lower portion 85 and a wider upper portion 86 that has a greater outside diameter than the lower portion 85, such that a shoulder surface 87 is formed at the intersection of the lower and upper portions 85, 86. The actuator 84 also includes a handle 88 attached to the upper portion 86. The actuator 84 also has an interior surface 89 which engages the poppets 80, 82. As best seen in FIGS. 10–13, the interior surface 89 of the actuator 84 includes an upper cylindrical portion 90 having a constant inside diameter, as shown by double arrow 91 (FIG. 11), and a lower eccentric and generally frustoconical portion 92 tapering outwardly from the cylindrical portion 90.

Figure 6:
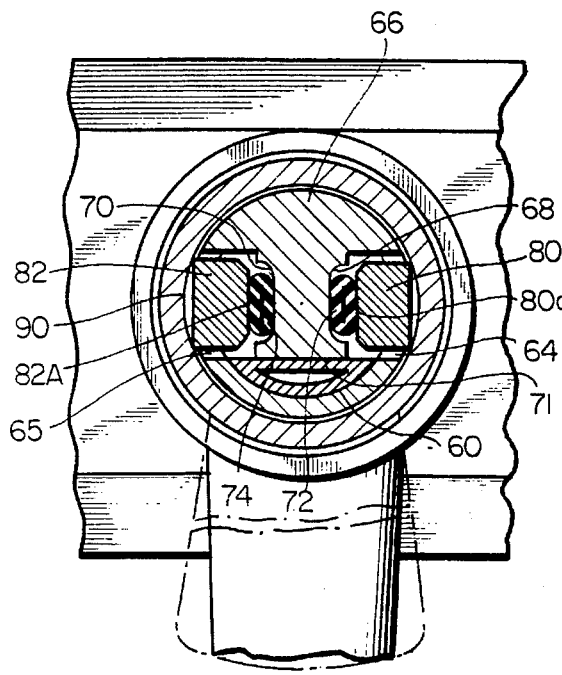
FIG. 6 is a fragmentary, sectional view taken generally along line 6—6 in FIG. 3.

As seen in FIGS. 3 and 6, when the cylindrical portion 90 is in contact with the poppets 80, 82 it pushes the first and second poppets 80, 82 radially inwardly in a direction substantially perpendicular to the axis of the cartridge retainer 58 and, respectively, toward the first and second side surfaces 68, 70 of the bearing wall 66 (which maintain the first and second pinch tubes 72, 74 substantially stationary), so that the distance between the first and second engaging ends 80a, 82a and the respective first and second side surfaces 68, 70 of the bearing wall 66 is such that the poppets 80, 82 pinch and close the first and second axial bores 76, 78 of the pinch tubes 72, 74.

Figure 11:
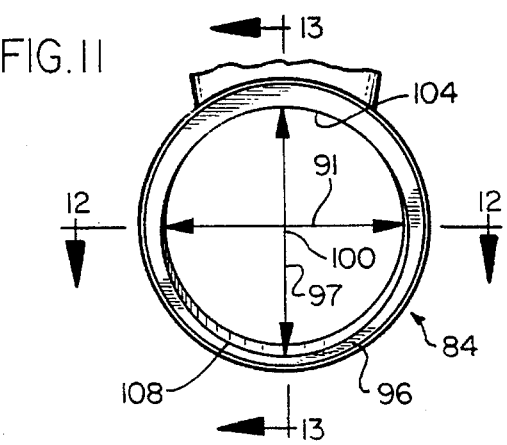
FIG. 11 is a fragmentary, bottom plan view of the actuator of FIG. 10.
Figure 12:
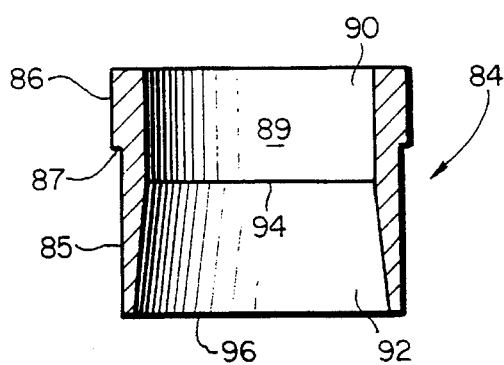
FIG. 12 is a sectional view taken generally along line 12—12 in FIG. 11.

As seen in FIGS. 10–13, the eccentric portion 92 of the actuator 84 is a generally divergent surface which continually increases in diameter axially downwardly from a lower end (line 94) of the upper cylindrical portion 90 to a longitudinally spaced lower circular end portion 96 having a maximum diameter, as shown by double arrow 97 (FIG. 11). As discussed below, due to this outward taper, the rate of flow through the pinch tubes 72, 74 is increased when the actuator 84 is raised axially.

In addition to being tapered, the eccentric portion 92 is eccentric with respect to the cylindrical portion 90, since the center 100 of the circular portion 96 and the center of each circular plane perpendicular to the axis of the actuator 84 between the lower end 94 of the cylindrical portion 90 and the lower circular portion 96 is offset from the axis of the cylindrical portion 90. This eccentricity controls the proportioning of the flow through the first and second pinch tubes 72, 74.

Figure 8:
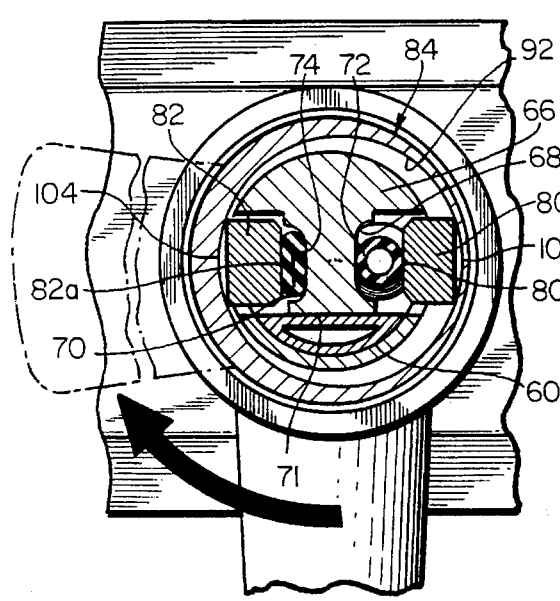
FIG. 8 is a view similar to FIG. 6, wherein the actuator has been raised and rotated to close only one of the pinch tubes.
Figure 9:
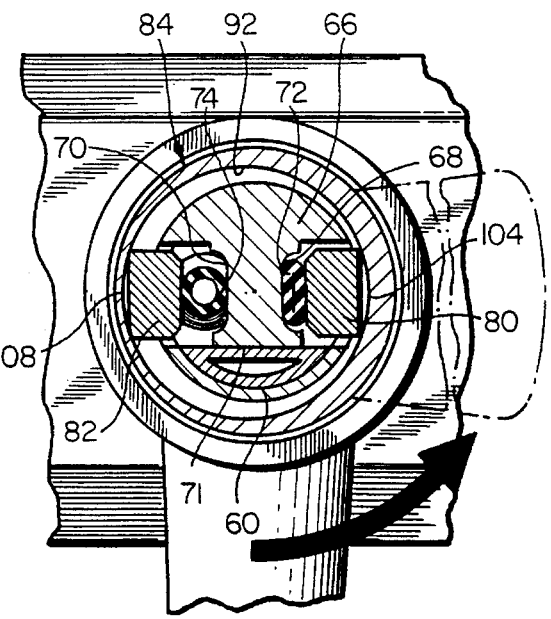
FIG. 9 is a view similar to FIG. 8, wherein the actuator has been rotated to close only the other pinch tube.
Figure 10:
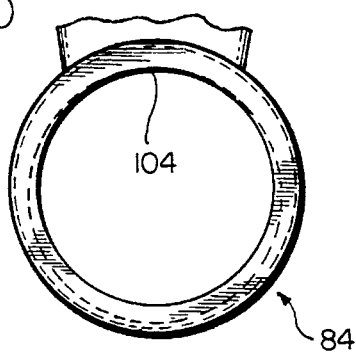
FIG. 10 is an enlarged, fragmentary, top plan view of the actuator shown in FIG. 2.
Figure 13:
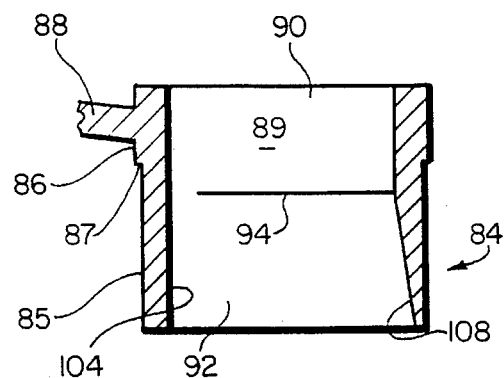
FIG. 13 is a sectional view taken generally along line 13—13 in FIG. 11.

As seen in FIGS. 11 and 13, a segment 104 of the eccentric portion 92 is generally vertically aligned with a segment of the cylindrical portion 90. This segment 104 of the eccentric portion 92, when in engagement with either the first or second poppet 80, 82, is effective in the same manner as the cylindrical portion 90 to close the pinch tube associated with the engaged poppet, thus blocking the flow through that pinch tube. As seen in FIGS. 8 and 9, in view of the outwardly tapering shape of the eccentric portion 92 (FIG. 13) when a segment 108 diametrically opposite the aligned segment 104 is aligned with the engagement end of the other poppet and the actuator 84 is fully raised, that poppet will be spaced at a distance from the associated side surface of the bearing wall 66 such that the other pinch tube tends to assume its undistorted shape. When intermediate regions of the eccentric portion 92, between end 94 and lower circular portion 96, engage the poppets, one pinch tube is closed and the other pinch tube is open to an extent depending on the axial position of the actuator 84.

As seen in FIG. 8, when the actuator 84 is fully raised and has been rotated so that segment 104 contacts the second poppet 82, the engaging end 82a of the second poppet 82 is pressed against and closes the second pinch tube 74. At the same time, segment 108 is in contact with the first poppet 80 and the engaging end 80a of the poppet 80 is at a distance from the first side surface 68 of the bearing wall 66 greater than the distance the engaging end 82a of the second poppet is from the second side surface 70 of the bearing wall 66 so that the cross-sectional area of the first bore 76 adjacent the first poppet 80 is greater than zero and thereby allows flow through the first bore 76.

Similarly, as seen in FIG. 9, when the actuator 84 is fully raised and is rotated 180 degrees from its position in FIG. 8, segment 104 is in contact with the first poppet 80 which engages and closes the first pinch tube 72 and surface 108 is in contact with the second poppet 82 allowing the axial bore 78 of the second pinch tube 74 to remain at least partially open to allow flow therethrough.

Figure 7:
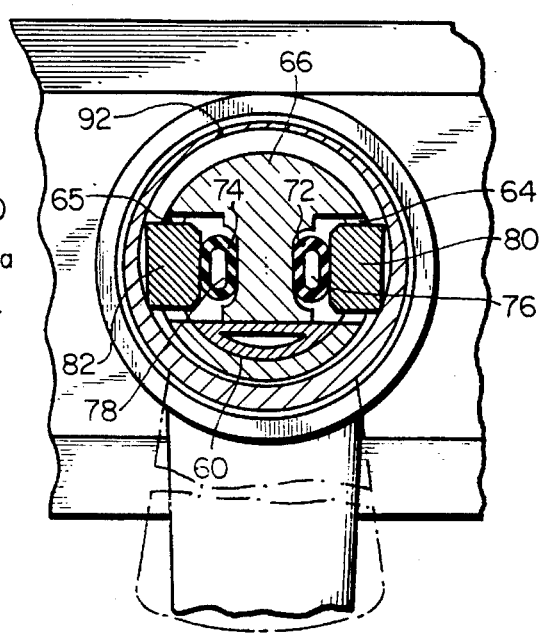
FIG. 7 is a fragmentary, sectional view taken generally along line 7—7 in FIG. 4.

As seen in FIG. 7, when the actuator 84 is axially raised so that the eccentric portion 92 engages the poppets 72, 74 and is rotated on its axis away from the position where the aligned segment 104 of the eccentric portion 92 engages a poppet, there will be liquid flow through both pinch tubes 72, 74, the proportioning of the respective flows being dependent on the angular or rotational position of the actuator 84, and the total volume of flow, or rate of flow, being dependent on the axial position of the actuator 84. Due to the outward taper of the eccentric portion 92, the higher the actuator 84 is raised axially, the greater the rate of flow.

The valve cartridge assembly 56 also has a mixing structure which includes a mixing chamber 110 disposed within the cartridge retainer 58. The mixing chamber 110 includes a cylindrical upper section 112 which rests, as seen in FIG. 5, on top of the bearing wall 66 and which is integral with an elongated part-cylindrical bottom section 114, a portion of which is adjacent surface 71 of the bearing wall 66. As seen in FIG. 2, the mixing chamber 110 also includes first and second inlet ducts 116, 118 disposed in the cylindrical upper section 112 and which, as seen in FIGS. 3–4, respectively have the upper ends of the first and second pinch tubes 72, 74 disposed therein. The first and second inlet ducts 116, 118 are tapered slightly inwardly to provide an interference fit with pinch tubes 72, 74. The mixing chamber 110 further includes a part-cylindrical discharge duct 120, as best seen in FIG. 5, in fluid communication with the L-shaped discharge duct 34 of the trunion 22.

The valve cartridge assembly 56 also includes an end cap 122 disposed above the cylindrical upper section 112. The end cap 122 has a cylindrical section 124 having external threads at its lower end which are engaged with the threads at the upper end of the cylindrical sidewall 60 of the cartridge retainer 58. The end cap 122 also has an annular flange 126 projecting radially outwardly from the cylindrical section 124 and a part-spherical interior surface 128 (FIG. 3). As discussed below and as best seen in FIGS. 3–5, the part-spherical interior surface 128 cooperates with the top of the cylindrical section 112 to define a mixing zone or space 129.

The valve cartridge assembly 56 further includes a generally cylindrical valve retainer 130 disposed about the actuator 84. The valve retainer 130 has an interior surface 132 and an exterior surface 134. The interior surface 132 is threaded at its bottom end and engaged with the threads of the trunion 22. The valve retainer 130 has an internal diameter slightly greater than the outside diameter of the lower portion 85 of the actuator 84 and less than the outside diameter of the upper portion 86. Thus, the shoulder surface 87 is engagable with the retainer 130 to limit the axial travel of the actuator 84 in its fully closed position, wherein the cylindrical portion 90 of the actuator 84 is in contact with the poppets 80, 82 and both the pinch tubes 72, 74 are closed. As seen in FIG. 4, the upward travel of the actuator 84, in its fully extended position, is limited by engagement of the upper portion 86 of the actuator 84 with the annular flange 126 of the end cap 122. When the actuator 84 is raised from its fully closed position, the eccentric portion 92 of the actuator 84 is in contact with the poppets 80, 82 and at least one of the pinch tubes 72, 74 is open at least partially to allow flow therethrough.

The valve retainer 130, as seen in FIGS. 3–5, also has an annular flange 136 projecting radially from the interior surface 132. After the valve retainer 130 has been threadedly engaged with the trunion 22, the flange 63 of the cartridge retainer 58 is trapped between flange 136 and the top of the cylindrical portion 31 of the trunion 22. This entrapment maintains the cartridge retainer 58 in a stationary position.

Flow through the valve/faucet assembly 20 is as follows. Assuming a hot water and a cold water supply line are, respectively, attached to the first and second supply ducts 29, 30 of the trunion 22, hot water flows through the first supply duct 29 to the first pinch tube 72, then to the first inlet duct 116 of the mixing chamber 110 and into the mixing space 129. Likewise, cold water flows through the second supply duct 30 to the second pinch tube 74 then to the second inlet duct 118 of the mixing chamber 110 to the mixing space 129, where it contacts and mixes with the hot water. The combined hot/cold water mixture then flows through and mixes further in the discharge duct 120 of the mixing chamber 110. The mixing space 129, defined by the part-spherical interior surface 128 of the cap 122 and top of the cylindrical upper section 112 of the mixing chamber 110, together with the part-cylindrical discharge duct 120 thereby form a mixing region to thoroughly mix the flows from the first and second pinch tubes 72, 74. This thorough mixing prevents laminar flow out of the spigot 44 (i.e., whereby one portion of water flow at the spigot is essentially all hot water and another portion essentially all cold water). The thoroughly mixed cold and hot water mixture then flows to discharge duct 34 of the trunion 22 and through and out the discharge passageway 45 of the spigot 44.

The valve cartridge assembly 56 can be replaced as a unit by simply unscrewing the valve retainer 130 from the trunion 22 and pulling the valve retainer 130 upwardly so that the valve retainer 130 contacts and pushes the actuator 84 upwards to contact the annular flange 126 of the end cap 122 connected to cartridge retainer 58, so that the valve cartridge assembly 56 is pulled off the trunion 22. A new valve cartridge assembly 56 can then be connected to the trunion 22.

Additionally, if only portions of the valve cartridge assembly 56 (rather than the entire assembly) need to be replaced, the valve cartridge assembly 56 can be disassembled by unscrewing the end cap 122 and accessing the part or parts to be replaced. For example, the pinch tubes 72, 74 can easily be replaced without replacing the entire valve cartridge assembly 56. The end cap 122 is simply unscrewed from the cartridge retainer 58, and the mixing chamber 110 is then lifted out of the cartridge retainer 58 to gain access to the pinch tubes 72, 74 for removal and replacement.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A valve cartridge comprising:

a cartridge retainer having a cartridge axis and a generally cylindrical sidewall having a top end, a bottom end and an opening;

a pinch tube having a length and disposed within the cartridge retainer, the pinch tube having a tube axis running the length thereof and substantially parallel to the cartridge axis and an axial bore therethrough;

a poppet disposed in the opening and movable in a direction not parallel with the tube axis for engagement with the pinch tube;

an actuator rotatable about and movable along the cartridge axis and encircling the cartridge retainer, the actuator having an interior surface engaging the poppet, the interior surface having a cylindrical portion having an inside diameter which, when engaged with the poppet, holds the poppet against the pinch tube for closing the bore, and an eccentric portion tapering outwardly from the cylindrical portion which, when engaged with the poppet, permits variations in the cross sectional area of the axial bore to control the rate of flow through the pinch tube upon at least one of rotational movement of the actuator about the cartridge axis and movement of the actuator along the cartridge axis; and a cap connected to the top end of the sidewall, the cap having an annular flange with an outside diameter greater than the inside diameter of the cylindrical portion, whereby the flange limits the movement of the actuator in a first axial direction along the cartridge axis.

2. The valve cartridge of claim 1, wherein the cartridge retainer includes a bearing wall disposed within and integral with the sidewall and wherein the pinch tube is disposed between the bearing wall and the sidewall, whereby the bearing wall aids in maintaining the pinch tube substantially stationary to allow the poppet to properly engage the pinch tube.

3. The valve cartridge of claim 2, wherein the poppets are substantially rectangular in transverse cross-section.

4. The valve cartridge of claim 1, wherein the sidewall of the cartridge retainer has a threaded interior surface at the top end and the top cap has a generally cylindrical sidewall having a threaded outer surface engaged with the threaded interior surface, the annular flange projecting outwardly from the sidewall of the top cap.

5. The valve cartridge of claim 1, wherein the actuator has an exterior surface and an annular shoulder projecting outwardly from the exterior surface and having an outside diameter, and further comprising a valve retainer surrounding the actuator and having a generally cylindrical sidewall and an inside diameter less than the outside diameter of the annular shoulder, whereby the sidewall of the valve retainer limits the movement of the actuator along the cartridge axis in a second axial direction opposite the first axial direction.

6. The valve cartridge of claim 1, wherein the pinch tube is constructed of a resilient material and biases the poppet against the interior surface of the actuator.

7. A valve cartridge comprising:

a cartridge retainer having a cartridge axis and a generally cylindrical sidewall having first and second openings;

first and second pinch tubes each having a length respectively disposed within the cartridge retainer, the first and second pinch tubes respectively having first and second tube axes running the length thereof substantially parallel to the cartridge axis and first and second axial bores therethrough;

a mixing structure in fluid communication with the first and second pinch tubes defining a mixing region having a portion disposed within the cartridge retainer;

first and second poppets respectively disposed in the first and second openings and respectively movable in directions not parallel with the first and second tube axes for engagement with the first and second pinch tubes; and an actuator rotatable about and movable along the cartridge axis and encircling the cartridge retainer, the actuator having an interior surface engaging the first and second poppets, the interior surface having a cylindrical portion having an inside diameter which, when engaged with the first and second poppets, holds the first and second poppets against the first and second pinch tubes for closing the first and second bores, and an eccentric portion tapering outwardly from the cylindrical portion which, when engaged with the first and second poppets, permits variations in the cross sectional areas of the first and second axial bores to control the rate of flow through the first and second pinch tubes upon at least one of rotational movement of the actuator about the cartridge axis and movement of the actuator along the cartridge axis.

8. The valve cartridge of claim 7, wherein the cartridge retainer includes a bearing wall having first and second sides disposed within and integral with the sidewall and wherein the first pinch tube is disposed between the first side of the bearing wall and the sidewall and the second pinch tube is disposed between the second side of the bearing wall and the sidewall, whereby the bearing wall aids in maintaining the first and second pinch tubes substantially stationary to allow the first and second poppets to properly engage the first and second pinch tubes, respectively.

9. The valve cartridge of claim 7, wherein the sidewall of the cartridge retainer has a top end, and further comprising a top cap connected to the top end of the sidewall, the cap having an annular flange with an outside diameter greater than the inside diameter of the cylindrical portion, whereby the flange limits the movement of the actuator in a first axial direction along the cartridge axis.

10. The valve cartridge of claim 9, wherein the actuator has an exterior surface and annular shoulder projecting outwardly from the exterior surface and having an outside diameter, and further comprising a valve retainer surrounding the actuator and having a generally cylindrical sidewall and an inside diameter less than the outside diameter of the annular shoulder, whereby the sidewall of the valve retainer limits the movement of the actuator along the cartridge axis in a second axial direction opposite the first axial direction.

11. The valve cartridge of claim 7, and further comprising a top cap having a part-spherical inner surface, wherein the mixing structure includes the part-spherical inner surface, a substantially planar surface, first and second inlet ducts opening at the planar surface and in fluid communication with the first and second pinch tubes, respectively, and an elongated mixing duct having a portion axially disposed alongside the first and second pinch tube, and wherein the part-spherical inner surface cooperates with the substantially planar surface of the mixing structure to define a first mixing zone in fluid communication with the first and second inlet ducts and the elongated mixing duct.

12. The valve cartridge of claim 7, wherein the first and second pinch tubes are constructed of a resilient material and respectively bias the first and second poppets against the interior surface of the actuator.

13. The valve cartridge of claim 7, wherein each of the first and second pinch tubes has an inlet end and an outlet end, and the mixing region has an inlet in communication with the outlet ends of the first and second pinch tubes and an outlet adjacent the inlet ends of the pinch tubes.

14. A valve cartridge and faucet assembly comprising:

a trunion having first and second supply ducts and a discharge duct;

a cartridge retainer having a cartridge axis and a generally cylindrical sidewall having first and second openings;

first and second pinch tubes each having a length, and respectively in fluid communication with the first and second supply ducts and disposed within the cartridge retainer, the first and second pinch tubes respectively having first and second tube axes running the length thereof and first and second axial bores therethrough;

a mixing structure defining a mixing region having an inlet in fluid communication with the first and second pinch tubes, and an outlet in fluid communication with the discharge duct of the trunion, the mixing region having a portion disposed within the cartridge retainer;

a spigot having a discharge passageway in fluid communication with the discharge duct of the trunion;

first and second poppets respectively disposed in the first and second openings and respectively movable in directions not parallel with the first and second tube axes for engagement with the first and second pinch tubes; and an actuator rotatable about and movable along the cartridge axis and encircling the cartridge retainer, the actuator having an interior surface engaging the first and second poppets, the interior surface having a cylindrical portion having an inside diameter which, when engaged with the first and second poppets, holds the first and second poppets against the first and second pinch tubes for closing the first and second bores, and an eccentric portion tapering outwardly from the cylindrical portion which, when engaged with the first and second poppets, permits variations in the cross sectional area of the first and second axial bores to control the rate of flow through the first and second pinch tubes upon at least one of rotational movement of the actuator about the cartridge axis and movement of the actuator along the cartridge axis.

15. The assembly of claim 14, wherein the cartridge retainer includes a bearing wall having first and second sides disposed within and integral with the sidewall and wherein the first pinch tube is disposed between the first side of the bearing wall and the sidewall and the second pinch tube is disposed between the second side of the bearing wall and the sidewall, whereby the bearing wall aids in maintaining the first and second pinch tubes substantially stationary to allow the first and second poppets to properly engage the first and second pinch tubes, respectively.

16. The assembly of claim 15, wherein the first and second tube axes are substantially parallel to the cartridge axis.

17. The assembly of claim 14, and further comprising a top cap having a part-spherical inner surface, wherein the inlet includes first and second inlet ducts respectively in fluid communication with the first and second pinch tubes, and each opening at a substantially planar surface of the mixing structure and wherein the sidewall of the cartridge retainer has a top end and a bottom end, the mixing structure includes the part-spherical inner surface which cooperates with the substantially planar surface to define a first mixing zone in fluid communication with the first and second inlet ducts and the discharge duct, the top cap connected to the top end of the sidewall and having an annular flange with an outside diameter greater than the inside diameter of the cylindrical portion, whereby the flange limits the movement of the actuator in a first axial direction along the cartridge axis.

18. The valve cartridge of claim 17, wherein the actuator has an exterior surface and an annular shoulder projecting outwardly from the exterior surface and having an outside diameter, and further comprising a valve retainer surrounding the actuator and having a generally cylindrical sidewall and an inside diameter less than the outside diameter of the annular shoulder, whereby the sidewall of the valve retainer limits the movement of the actuator along the cartridge axis in a second axial direction opposite the first axial direction.

19. The assembly of claim 17, wherein the mixing structure includes an elongated mixing duct in fluid communication with the discharge duct, and wherein the trunion includes a bore disposed above the discharge duct and receiving the mixing duct of the mixing structure therein, whereby the mixing region includes the first mixing zone and the mixing duct and allows the flows from the first and second pinch tubes to mix thoroughly prior to discharge through the spigot to prevent laminar flow.

20. The valve cartridge of claim 14, wherein the first and second pinch tubes are constructed of a resilient material and respectively bias the first and second poppets against the interior surface of the actuator.

* * * * *